(12) United States Patent
Coleman

(10) Patent No.: US 7,918,247 B2
(45) Date of Patent: Apr. 5, 2011

(54) GARDEN HOSE WITH BACKBONE

(75) Inventor: Trent Coleman, Brampton (CA)

(73) Assignee: Ames True Temper, Inc., Camp Hill, PA (US)

( * ) Notice: Subject to any disclaimer, the term of this patent is extended or adjusted under 35 U.S.C. 154(b) by 1552 days.

(21) Appl. No.: 10/969,414

(22) Filed: Oct. 20, 2004

(65) Prior Publication Data

US 2006/0081303 A1 Apr. 20, 2006

(51) Int. Cl.
*F16L 11/00* (2006.01)

(52) U.S. Cl. ......... 138/137; 138/153; 138/172; 138/121

(58) Field of Classification Search .................. 138/119, 138/137, 153, 172, 121
See application file for complete search history.

(56) References Cited

U.S. PATENT DOCUMENTS

| | | | |
|---|---|---|---|
| 2,640,502 A | 6/1953 | Powers | |
| 3,056,428 A * | 10/1962 | Brown et al. | 138/118 |
| 3,430,631 A * | 3/1969 | Abramson | 604/541 |
| 3,825,036 A * | 7/1974 | Stent | 138/174 |
| 4,098,298 A * | 7/1978 | Vohrer | 138/122 |
| 4,131,399 A * | 12/1978 | Calvet | 417/477.12 |
| 4,140,154 A * | 2/1979 | Kanao | 138/132 |
| 4,257,422 A | 3/1981 | Duncan | |
| 4,410,012 A * | 10/1983 | Redding et al. | 138/121 |
| 4,661,396 A * | 4/1987 | Andorf et al. | 428/217 |
| 4,867,485 A | 9/1989 | Seckel | |
| 4,923,223 A | 5/1990 | Seckel | |
| 5,176,180 A | 1/1993 | Williams et al. | |
| 5,246,254 A | 9/1993 | LoJacono, Jr. et al. | |
| 5,573,039 A | 11/1996 | Mang | |
| 5,682,925 A | 11/1997 | Seckel | |
| 5,827,242 A * | 10/1998 | Follmer et al. | 604/526 |
| 6,105,620 A | 8/2000 | Haberl | |
| 6,537,630 B1 * | 3/2003 | Ogawa | 428/36.9 |
| 2003/0116216 A1 | 6/2003 | Espinasse | |
| 2003/0216700 A1 | 11/2003 | Pearson et al. | |

* cited by examiner

*Primary Examiner* — James F Hook
(74) *Attorney, Agent, or Firm* — Eckert Seamans Cherin & Mellott, LLC; David C. Jenkins, Esquire

(57) ABSTRACT

An improved garden hose including an elongated generally cylindrical inner core being made of a first material, the inner core having an integrally formed backbone being made of a second material. The second material has a higher durometer than the first material.

20 Claims, 2 Drawing Sheets

GARDEN HOSE WITH BACKBONE

BACKGROUND OF THE INVENTION

1. Field of the Invention

The present invention relates to an improved garden hose with a backbone that resists kinking.

2. Description of the Related Art

Anti-kinking garden hoses are known in the art. See, U.S. Pat. Nos. 4,867,485; 4,923,223; 5,246,254; and 2,640,502. For example, U.S. Pat. Nos. 4,867,485 and 4,923,223 disclose providing a plurality of ribs which are constructed and arranged to form a flow opening if and when a hose is kinked. U.S. Pat. No. 2,640,502, on the other hand, discloses a spring wire that is disposed in the hose to resist kinking.

What is needed, however, is a garden hose that is easy to manufacture and that effectively prevents kinking.

SUMMARY OF THE INVENTION

The present invention meets the above needs as well as others. The improved garden hose of the invention includes an elongated generally cylindrical inner core being made of a first material, the inner core having an integrally formed backbone being made of a second material. The second material has a higher durometer hardness than the first material.

An inner core by itself and an improved garden hose having an outlet end, inlet end and a hose portion are also disclosed.

BRIEF DESCRIPTION OF THE DRAWINGS

Like reference characters denote like features throughout the drawings.

DETAILED DESCRIPTION

Figure 1:
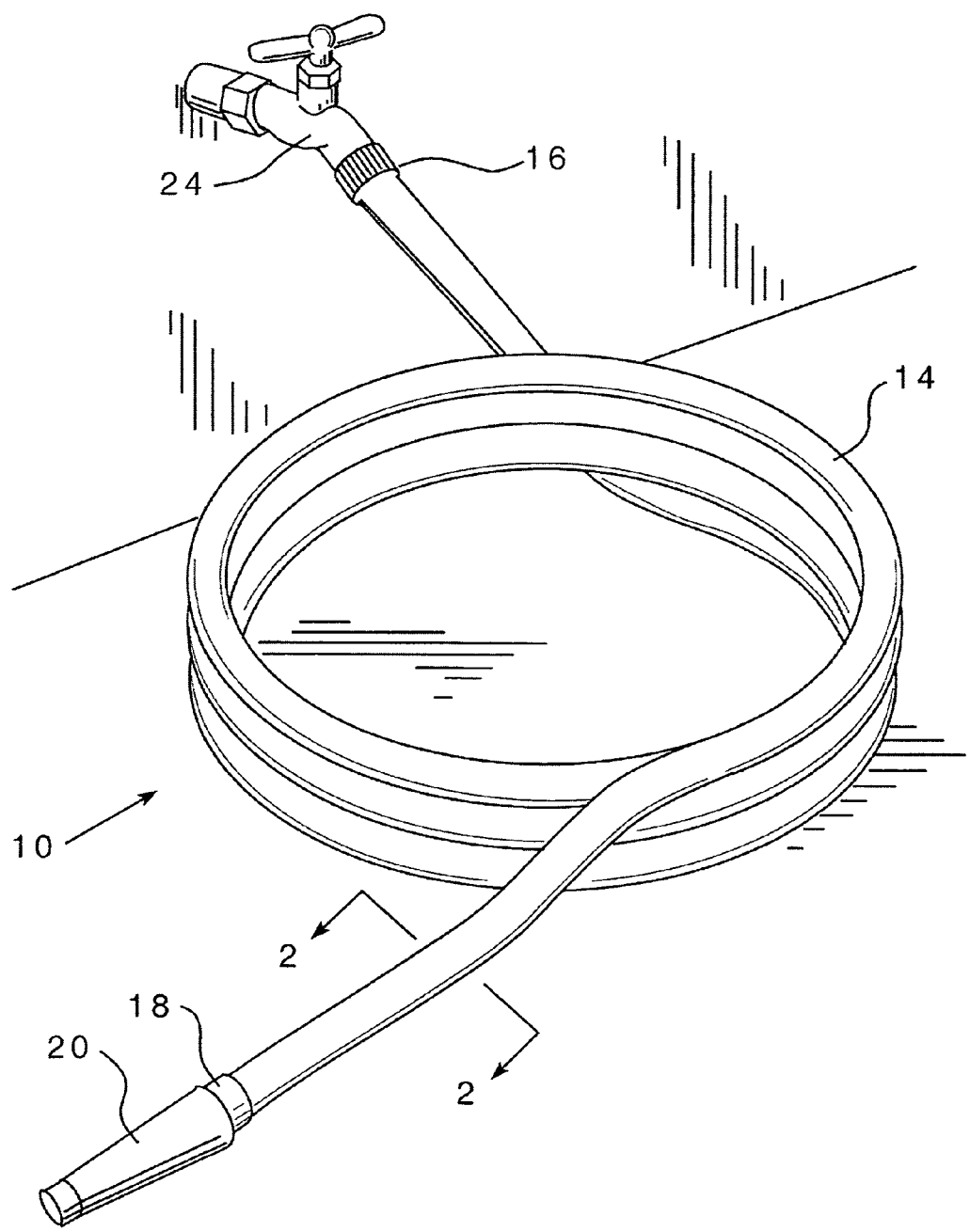
FIG. 1 is a pictorial view of the improved garden hose of the invention showing it connected to a spigot and having a nozzle thereon.

Referring to FIG. 1, there is shown an improved garden hose 14 having an inlet end 16 and an outlet end 18. A flow restricting device, such as a nozzle 20, is shown threadedly secured to the outlet end. The inlet end 16 is threadedly secured to a spigot 24.

Figure 2:
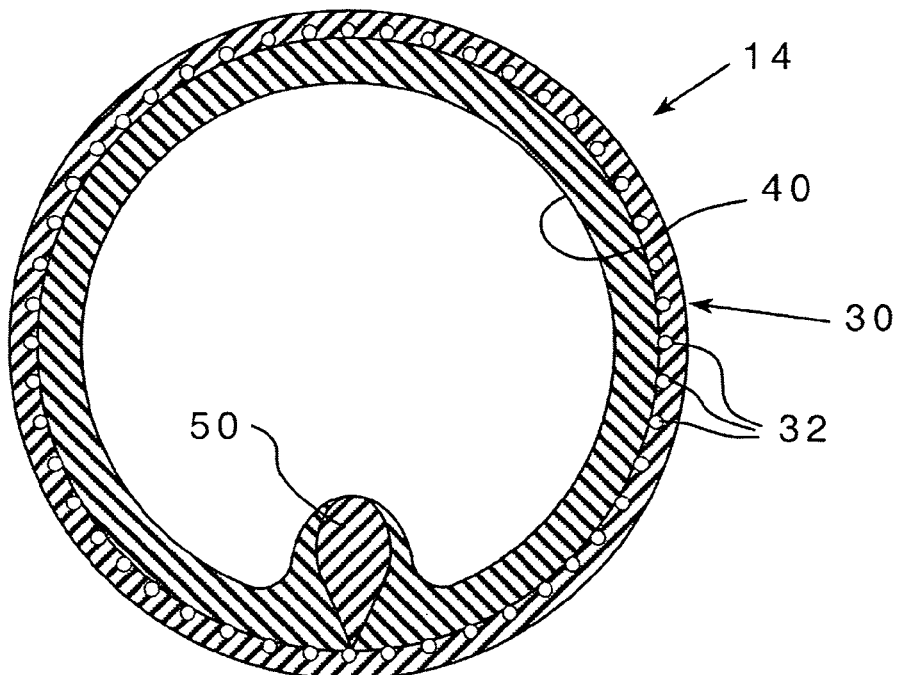
FIG. 2 is a cross-sectional view of an improved garden hose taken through line 2-2 of FIG. 1.

Referring now to FIG. 2, the structure of the improved garden hose will be discussed in greater detail. The hose portion 14 is made up of an outer covering 30 that is preferably made of vinyl that is reinforced by cross-knitted fibers 32. This type of outer covering 30 is well-known in the prior art.

An inner core 40 is secured to and is surrounded by the outer covering 30. The inner core has a generally elongated cylindrical shape, with a generally circular cross-section as can be seen in FIG. 2. The inner core 40 includes a backbone 50 of the invention that is preferably co-extruded with the inner core 40, as will be discussed in further detail below. The inner core 40 and the backbone 50 are both preferably made of polyvinylchloride ("PVC"). In accordance with the invention, the durometer hardness of the inner core 40 is less than the durometer hardness of the backbone 50. Preferably, the durometer hardness of the backbone 50 is at least 5% greater than the durometer hardness of the inner core 40. The durometer hardness of the backbone 50, more preferably, is between Shore A 90 and Shore A 94, with Shore A 92 being most preferred. The durometer hardness of the inner core, more preferably is between Shore A 80 and Shore A 84, with Shore A 82 being most preferred.

As is understood in the relevant art, a durometer is a device which measures the hardness of a material on any of a variety of scales such as the Shore A hardness scale, which is used herein. It will be appreciated that other hardness scales, such as Rockwell or Brinell, can be used.

The backbone 50 extends substantially the entire length of the hose portion of the improved garden hose, and preferably terminates short of the outlet end 18 and the inlet end 16.

The hose of the invention is made by first extruding the inner core 40 and then, almost simultaneously, extruding thereon the backbone 50. This is known in the art as a co-extrusion process. Once the inner core is formed, it is introduced into a cooling tank, where the PVC sets. After this, and as is conventional in the hose-making art, the fibers 32 are knitted onto the inner core 40 with a knitting machine. The final step is then to extrude the vinyl covering 30 onto the hose.

After these steps, the outlet end and inlet end fixtures are placed onto the hose, in a conventional manner as is known in the art, to form the finished garden hose.

Figure 3:
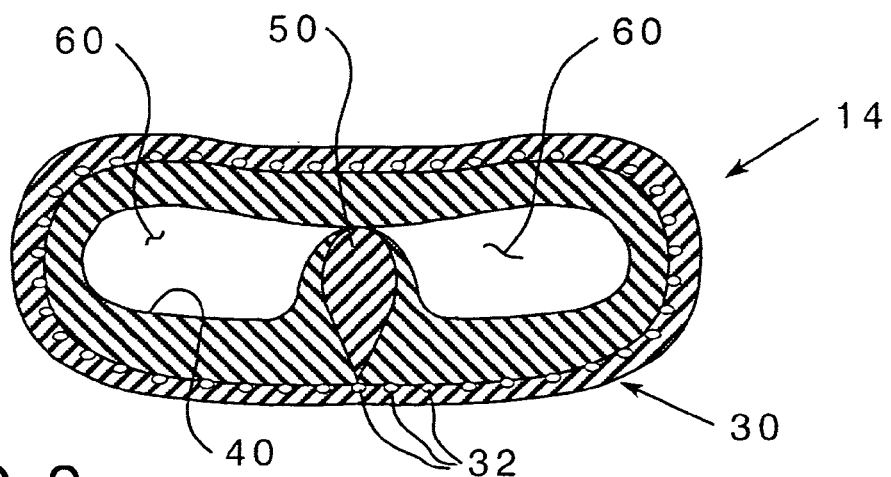
FIG. 3 is a cross-sectional view similar to FIG. 2 only showing the hose when it is kinked.

Referring to FIG. 3, when the hose is kinked, the backbone 50 allows for a passageway 60 for water to still flow. Of course, the backbone 50 itself will resist kinking in the first place, so this feature may not even be necessary.

It will be appreciated that an improved garden hose that resists kinking is provided. The improved garden hose is easy to manufacture and use, and even if kinking occurs, water will still flow through the hose.

While a specific embodiment of the invention has been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the appended claims and any and all equivalents thereof.

What is claimed is:

1. An improved garden hose including an inner core being made of a first material, said inner core including an elongated generally cylindrical inner core member having an integrally formed backbone being made of a second material, said second material having a higher durometer hardness than said first material.

2. The garden hose of claim 1, wherein said first material is PVC and said second material is PVC.

3. The garden hose of claim 2, wherein said second material has a durometer hardness that is at least five percent (5%) greater than the durometer hardness of said first material.

4. The garden hose of claim 3, wherein
said first material has a durometer hardness in the range of about Shore A 80 to about Shore A 84; and
said second material has a durometer in the range of about Shore A 90 to about Shore A 94.

5. The garden hose of claim 4, wherein
said first material has a durometer hardness of about Shore A 82 and said second material has a durometer hardness of about Shore A 92.

6. The garden hose of claim 1, wherein said inner core and said backbone are co-extruded.

7. The garden hose of claim 1, wherein said backbone is disposed generally the entire length of said garden hose.

8. The garden hose of claim 7, wherein said backbone terminates before reaching an inlet end of said garden hose.

9. The garden hose of claim 8, wherein said backbone terminates before reaching an outlet end of said garden hose.

10. An elongated inner core for a garden hose, said inner core being generally cylindrical and including an integrally formed backbone, said inner core being made of a first material and said backbone being made of a second material wherein said second material has a higher durometer hardness than said first material.

11. The inner core of claim 10, wherein said first material is PVC and said second material is PVC.

12. The inner core of claim 11, wherein said second material has a durometer hardness that is at least five percent (5%) greater than the durometer hardness of said first material.

13. The inner core of claim 12, wherein
said first material has a durometer hardness of about Shore A 80 to about Shore A 84; and
said second material has a durometer hardness of about Shore A 90 to about Shore A 94.

14. The inner core of claim 13, wherein
said first material has a durometer hardness of about Shore A 82 and said second material has a durometer hardness of about Shore A 92.

15. The inner core of claim 10, wherein said inner core and said backbone are co-extruded.

16. An improved kinking-resistant garden hose comprising:
an outlet end adapted to be connected to a flow-restricting device:
an inlet end adapted to be connected to a water source; and
a hose portion, said hose portion having an outer covering and an elongated inner core, said inner core being generally cylindrical and including an integrally formed backbone, said inner core being made of a first material and said backbone being made of a second material wherein said second material has a higher durometer hardness than said first material.

17. The garden hose of claim 16, wherein said first material is PVC and said second material is PVC.

18. The garden hose of claim 17, wherein said second material has a durometer hardness that is at least five percent (5%) greater than the durometer hardness of said first material.

19. The garden hose of claim 18, wherein said second material has a durometer hardness that is at least five percent (5%) greater than the durometer hardness of said first material.

20. The garden hose of claim 19, wherein
said first material has a durometer hardness of about Shore A 82 and said second material has a durometer hardness of about Shore A 92.

\* \* \* \* \*